Patented June 25, 1929.

1,718,492

UNITED STATES PATENT OFFICE.

HANS SCHMIDT, OF VOHWINKEL, GERMANY, ASSIGNOR TO WINTHROP CHEMICAL COMPANY, INC., OF NEW YORK, N. Y.

COMPLEX METAL COMPOUND OF PYROCATECHIN.

No Drawing. Application filed April 30, 1927, Serial No. 188,040, and in Germany February 6, 1924.

The object of my invention is the manufacture of soluble complex metallic organo compounds which have a neutral reaction. This important requirement in itself, as is well known, constitutes a problem in medicinal dispensing in the case of many substances which are applied therapeutically.

According to one feature of this invention, complex organo compounds with pyrocatechin sulfonic acids other than those of antimony, are manufactured by causing a compound of a heavy metal to react with a pyrocatechin sulfonic acid or a salt thereof.

To obtain compounds having a neutral reaction it is very often necessary for the reaction to be carried out with the addition of an alkali, ammonia, or an amine. The term "alkali" may be conveniently used to designate both the fixed and volatile alkalies and is used in that sense in the appended claims.

A simple method of manufacture consists in dissolving the hydroxide of the respective metal in the solution of pyrocatechin sulfonic acid in alkali or an amine with the addition of alkali or amine, such that at the termination of the reaction the solution possesses a neutral reaction.

From the latter direction it is obvious that for the formation of a salt dissolving with a neutral reaction the quantity of alkali or amine, which is combined with the acid residue of the pyrocatechin derivative, is in general not sufficient to produce neutrality, but that the complex as such requires still further alkali or amine for the production of a neutral reaction. With some metallic oxides, as for example with cadmium, a salt exhibiting a neutral reaction can be obtained without the addition of alkali.

Such complex salts can, for example, be prepared from metals such as cadmium, iron, manganese, zinc, chromium, tin, vanadium, copper, gold, calcium, arsenic, lead, bismuth.

From a single oxide various complex salts can be obtained according to the quantity of the metal or metalloid compound which has interacted with the organo compound producing the formation of the complex compounds.

According to a further feature of this invention similar new complex compounds comprising a pyrocatechin carboxylic acid or a pyrogallol sulfonic acid are manufactured in a similar manner.

Of the compounds of the first of said acids those of the metals and metalloids (other than antimony) come into consideration while of the compounds of the second of said acids, those of the heavy metals including the antimony compounds, come into consideration, as the antimony and bismuth compounds which were heretofore unknown.

The invention is illustrated in the accompanying examples:—

*Example 1.*—35 grams of the potassium salt of pyrocatechin disulfonic acid are dissolved in 200 c. c. of water and to the hot solution is added a suspension of copper hydroxide prepared from copper sulfate by precipitation with caustic soda lye, filtration and washing and stirring with water, so long as the suspension continues to be dissolved. At the same time dilute caustic potash lye is introduced into the reaction mixture so that at the termination of the process the mixture reacts completely or nearly neutral. The whole is filtered and the complex salt formed can be obtained from the dark green solution by precipitation with an organic solvent or by evaporation.

Instead of caustic alkali, ammonia or an amine can be used for the dissolving.

*Example 2.*—35 grams of the potassium salt of pyrocatechin disulfonic acid are dissolved in 200 c. c. of water and boiled for some time with 7 grams of arsenious acid. At the same time the requisite quantity of caustic potash lye for achieving neutrality is added. After cooling, the whole is, after being allowed to stand for some time, filtered from the undissolved arsenious acid and the filtrate concentrated by evaporation, after which the complex arsenious salt is precipitated with methyl alcohol; the precipitate after filtration and drying is obtained as a voluminous powder.

It has the probable formula:

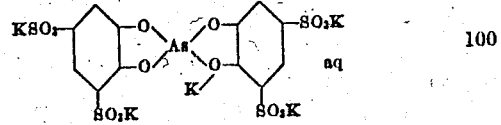

*Example 3.*—In a hot solution of 35 grams of the potassium salt of pyrocatechin disulfonic acid, cadmium hydroxide is dissolved to the extent required for the production of a neutral or practically neutral solution. After filtration and cooling the complex salt formed is precipitated by the addition of an organic liquid as a colourless flocculent precipitate.

It is noteworthy in this case that on working with cadmium hydroxide a neutrally reacting complex salt is obtained without the necessity of requiring the addition of bases. The same is true in the case of the complex salt of calcium. The complex salt can however be prepared with the addition of alkali.

In the manufacture of a complex cadmium salt, cadmium carbonate can also be applied. In this case a compound is then obtained of a lower cadmium content.

*Example 4.*—54 grams of the potassium salt of pyrocatechin disulfonic acid are boiled under reflux for some time with 150 c. c. of water and 11 grams of manganese carbonate in an atmosphere of carbon-dioxide. After cooling the liquid is filtered and from the filtrate the complex salt formed is precipitated by the addition of methyl alcohol. It is obtained as a grey powder which is soluble in water with a yellowish green colouration. It has the probable formula:

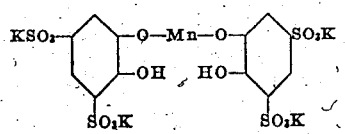

*Example 5.*—54 grams of the potassium salt of pyrocatechin disulfonic acid are dissolved in 200 c. c. of water and an aqueous suspension of stannous hydroxide is added, prepared from a solution of 14 grams of stannous chloride in water by precipitation with ammonia, washing and stirring with water. The resulting solution is neutralized with dilute caustic potash lye, filtered and the filtrate evaporated in vacuo. The complex tin salt remains as a light coloured powder which dissolves easily in water. The preparation and storing should take place as far as possible with the exclusion of air, since the product slowly takes up oxygen.

Other complex salts can be prepared with different contents of tin by modifying the proportions of the reacting materials.

*Example 6.*—Into a solution of 50 grams of the potassium salt of pyrocatechin disulfonic acid in 100 c. c. of water, heated on the water bath, a suspension of chromium hydroxide is gradually introduced, prepared from 100 grams of chrome alum, by precipitation of the aqueous solution with ammonia, filtering, washing, and stirring with water. After about two days solution of the chromium hydroxide which takes place relatively slowly is complete. The solution is filtered from insoluble matter, the filtrate is neutralized with dilute caustic potash lye and evaporated to dryness. The complex salt is thus obtained as a dark powder, which dissolves easily in water with a green colouration.

*Example 7.*—21 grams of the potassium salt of pyrocatechin disulfonic acid are dissolved in water and vanadyl hydroxide, prepared from 7 grams of ammonium vanadate by reduction, is dissolved therein. Dilute caustic potash lye is added to the deep dark solution, until the reaction becomes neutral, when the solution is filtered and the complex compound precipitated by pouring the filtrate into methyl alcohol. After filtering and drying a deep dark blue powder is obtained, which dissolves easily in water.

*Example 8.*—12 grams of the potassium salt of pyrocatechin monosulfonic acid are dissolved in water and an aqueous suspension of copper hydroxide is added, obtained from 10 grams of copper sulfate by precipitation with alkali and washing. The whole is heated with the addition of sufficient caustic potash lye so that at the termination the reaction is neutral. The liquid is then filtered from insoluble matter and the filtrate evaporated. After powdering a greenish coloured substance, is obtained, which easily dissolves in water.

*Example 9.*—50 grams of the sodium salt of pyrocatechin sulfonic acid are dissolved in a little water and a suspension of aluminium hydroxide is added, prepared from 175 grams of potash alum by precipitation with sodium carbonate and washing. The whole is heated and caustic soda lye is introduced until a neutral reaction is obtained, when the liquid is filtered and evaporated. The powdered residue is slightly coloured and dissolves easily in water.

The same salt can be obtained by employing commercial hydrated aluminium oxide.

*Example 10.*—A solution of 27.5 grams of the potassium salt of pyrocatechin disulfonic acid in 75 c. c. of water is shaken together with 11 grams oxide of lead for some hours. It is filtered and from the filtrate the lead compound is precipitated by stirring the liquid into methyl alcohol. It is soluble in water. The iron compound can also be prepared.

*Example 11.*—A solution of 31 grams of protocatechuic acid in 200 c. c. of water and the equivalent amount of caustic soda lye are heated for some time on the water bath with copper hydroxide, prepared by precipitation of the aqueous solution of 60 grams of copper sulfate with alkali and washing, after which caustic soda lye is further added to the extent that on the completion of the process there will obtain a neutral or almost neutral reaction. The undissolved copper hydroxide is then filtered off and the filtrate is evaporated to dryness. The residue can be ground to a dark powder, which easily dissolves again in water.

*Example 12.*—A solution of 31 grams of protocatechuic acid in 200 c. c. of water and the equivalent quantity of caustic soda lye is heated on the water bath with iron hydroxide prepared from 20 grams of iron sulfate by precipitation of the aqueous solution with alkali and washing, after which caustic soda lye is added to the extent that the reaction on completion of process becomes neutral or practically neutral. The liquid is filtered from undissolved iron hydroxide and the filtrate is evaporated. After completely drying the residue can be ground to a dark red powder, which easily dissolves in water.

*Example 13.*—A solution of 15.5 grams of protocatechuic acid and the equivalent quantity of dilute caustic soda lye is heated on the water bath with tin hydroxide, prepared of 20 grams of stannous chloride by precipitation of the aqueous solution with ammonia, filtering and washing, after which caustic soda is added to the extent that the reaction at the termination of the process becomes neutral or practically neutral. The liquid is filtered from undissolved substances and evaporated in vacuo. The residue can be ground to a practically colourless powder. The tin protocatechuic acid sodium salt dissolves in water advantageously by gently heating. The aqueous solution forms stannous sulfide with hydrogen sulfide.

On account of the easily oxidizable nature of the compounds the above method of working should be carried out as far as possible with exclusion of air.

*Example 14.*—20 grams of the potassium salt of pyrogallol disulfonic acid are boiled for some time in 100 c. c. of water with 6 grams of antimonyoxide and sufficient caustic potash lye in order that the completion of the operation a neutral reaction may obtain. When no further antimonyoxide passes into solution the whole is filtered the liquid concentrated and stirred into methyl alcohol. The complex antimony salt is thereby precipitated and on separation is obtained in the form of a colourless or weakly coloured powder of the probable formula:

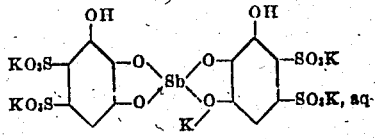

It is easily soluble in water, the aqueous solution remaining clear on the addition of dilute caustic soda lye or dilute sulfuric acid.

*Example 15.*—A solution of 20 grams of the potassium salt of pyrogallol disulfonic acid in 100 c. c. of water is caused to dissolve a suspension of bismuth oxide prepared from 24 grams of bismuth nitrate by treatment with alkali and washing, heating being resorted to. The liquid is neutralized with caustic potash lye and filtered. The new complex bismuth compound is separated from the filtrate by evaporation or concentration and precipitation with methyl alcohol in the form of a yellowish brown powder, which is soluble in water. The solution is likewise not precipitated by excess of alkali lye. Hydrogen sulfide precipitates bismuth sulfide.

The complex salts of other metals are formed in an analogous manner.

Instead of pyrogallol disulfonic acid other sulfonic acids of pyrogallol can be applied. For the formation of the salts other alkalis, ammonia or amines can be employed.

By selecting other proportions of materials, as in the case of the further examples, salts can be obtained possessing a different content of metallic oxide.

*Example 16.*—30 grams of the potassium salt of pyrogallol disulfonic acid are dissolved in 100 c. c. of hot water and an aqueous suspension of stannous hydroxide is introduced, prepared from a solution of 22.5 grams of stannous chloride in water by precipitation with ammonia, washing and stirring with water. Dilute caustic potash lye is added until the solution is practically neutral, when it is filtered from undissolved materials and the filtrate evaporated in vacuo. The preparation and storing should be effected in the absence of air as far as is possible. A slightly coloured powder is obtained which dissolves easily in water. Hydrogen sulfide precipitates tin sulfide.

*Example 17.*—When preparing complex cadmium compounds, products with differing cadmium content can be obtained according to the respective mode of working as shown by the following data:—

In an aqueous solution of the potassium salt of pyrogallol disulfonic acid, which is heated to the boiling temperature and with the simultaneous passage of hydrogen, cadmium hydroxide is dissolved to the extent required for the production of a neutral or only weakly alkaline solution. On cooling the liquid is filtered and the complex compound is precipitated by pouring the solution into methyl alcohol. The salt contains 15% of cadmium and forms a greenish crystalline powder.

If the above compound is treated with an excess of caustic potash lye and thereupon with kaolin for the purpose of absorbing any colloidal cadmium hydroxide and the whole is then filtered, methyl alcohol causes the separation from this filtrate of a yellow complex compound containing only 4% of cadmium.

Cadmium carbonate can be also employed for the manufacture of a complex cadimum compound, when a compound containing 12% of cadmium results.

All these compounds are easily soluble in water.

*Example 18.*—20 grams of the potassium salt of pyrogallol disulfonic acid are dissolved in water and vanadyl hydroxide, prepared from 7 grams of ammonium vanadate by reduction, is then added. Dilute caustic potash lye is used for rendering the reaction neutral, after which the whole is filtered and the filtrate is precipitated by pouring into methyl alcohol. After filtration and drying a deep dark blue powder is obtained, which dissolves easily in water.

*Example 19.*—40 grams of the potassium disulfonate of pyrogallic acid are boiled under reflux with 12 grams of manganese carbonate in 150 c. c. of water in a stream of carbon dioxide until a clear solution results. Once and again there remains at the bottom a small white residue of excess of manganese carbonate which easily deposits. The solution is neutral and after cooling is filtered rapidly and stirred into 800 c. c. of methyl alcohol. The complex manganese salt which is thereby precipitated is filtered, washed with methyl alcohol and dried in vacuo. It then forms a yellowish green powder, which in contact with the air becomes deep yellow; it dissolves readily in water with a neutral reaction and a bright green colouration.

*Example 20.*—30 grams of the potassium salt of pyrogallo monosulfonic acid are dissolved in 200 c. c. of water, 15 grams of antimony oxide are added and the solution is then boiled. 2 N caustic potash lye is introduced until the solution is just neutral, boiling being continued for a short time. After filtration the complex salt crystallizes from the filtrate on cooling. By the addition of alcohol the separation can be rendered complete. The product dissolves easily in water, no precipitation being caused on the addition of dilute caustic soda lye or sulfuric acid. Hydrogen sulfide precipitates antimony sulfide from the acidified solution.

*Example 21.*—4 grams of the potassium salt of pyrogallol disulfonic acid are dissolved in 15 c. c. of water, the solution is neutralized with dilute caustic potash lye and cooled. Thereupon 2.2 grams of lead oxide are added in the form of a powder. The greater part of the lead oxide dissolves in the solution to which, if necessary, dilute potash lye is further added until neutralization is effected. After filtration from any undissolved lead oxide the filtrate is precipitated by pouring into methyl alcohol. By filtering, washing and drying, the complex lead salt is obtained. It dissolves easily in water the solution not being precipitated by excess of caustic soda lye. Hydrogen sulfide causes the formation of lead sulfide.

The presence of sulfonic or carboxylic groups in the compounds of this invention renders the compounds soluble in water and stable in aqueous solution. These groups may be conveniently referred to as "solubilizing acid groups".

I claim:—

1. The process of producing new soluble complex organo metallic compounds by causing a compound of a heavy metal (other than antimony) to react with a pyrocatechin which is substituted by at least one solubilizing acid group.

2. As new articles of manufacture the products being chemically complex organo metallic compounds of a pyrocatechin which is substituted by at least one solubilizing acid group, containing a heavy metal (other than antimony) in a complex form, being soluble in water with a neutral reaction and being valuable pharmaceutical products.

3. As new articles of manufacture the products being chemically complex organo metallic compounds of a pyrocatechin sulfonic acid containing a heavy metal (other than antimony) in a complex form, being soluble in water with a neutral reaction and being valuable pharmaceutical products.

4. As new articles of manufacture the products being chemically complex organo metallic compounds of a pyrocatechin disulfonic acid containing a heavy metal (other than antimony) in a complex form, being soluble in water with a neutral reaction and being valuable pharmaceutical products.

5. As new articles of manufacture the products being chemically complex organo arsenic compounds of a pyrocatechin disulfonic acid, being whitish powders soluble in water with a neutral reaction and being valuable pharmaceutical products.

6. As a new product the compound of the probable formula:

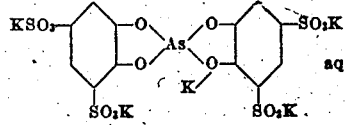

being a whitish powder soluble in water with a neutral reaction and being a valuable pharmaceutical product.

7. A process as claimed in claim 1 in which the reaction is carried out with the addition of an alkali.

In testimony whereof I have hereunto set my hand.

HANS SCHMIDT.